(12) United States Patent
Truong et al.

(10) Patent No.: US 12,321,489 B2
(45) Date of Patent: *Jun. 3, 2025

(54) PRIVACY PRESERVING DATA LABELING

(71) Applicant: Capital One Services, LLC, McLean, VA (US)

(72) Inventors: Anh Truong, Champaign, IL (US); Austin Walters, Savoy, IL (US); Jeremy Goodsitt, Champaign, IL (US); Vincent Pham, Seattle, WA (US); Reza Farivar, Champaign, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,698

(22) Filed: Nov. 7, 2023

(65) Prior Publication Data
US 2024/0070318 A1     Feb. 29, 2024

Related U.S. Application Data

(63) Continuation of application No. 17/177,822, filed on Feb. 17, 2021, now Pat. No. 11,847,245.

(51) Int. Cl.
*G06F 21/00* (2013.01)
*G06F 18/2132* (2023.01)
(Continued)

(52) U.S. Cl.
CPC ...... *G06F 21/6245* (2013.01); *G06F 18/2132* (2023.01); *G06N 20/00* (2019.01); *G06V 20/62* (2022.01); *G06V 30/274* (2022.01)

(58) Field of Classification Search
CPC . G06F 21/6245; G06F 18/2132; G06N 20/00; G06N 3/045; G06N 3/084; G06V 20/62; G06V 30/274
See application file for complete search history.

(56) References Cited

U.S. PATENT DOCUMENTS 10,546,054 B1 *   1/2020   Foroughi ............... G06N 20/00
10,713,821 B1 *   7/2020   Surya .................... G06N 3/045
(Continued)

OTHER PUBLICATIONS

Shrivastava, Ashish, et al. "Learning from simulated and unsupervised images through adversarial training." Proceedings of the IEEE conference on computer vision and pattern recognition. 2017. (Year: 2017).*

(Continued)

*Primary Examiner* — Ka Shan Choy
(74) *Attorney, Agent, or Firm* — Banner & Witcoff, Ltd.

(57) ABSTRACT

Systems as described herein may label data to preserve privacy. An annotation server may receive a document comprising a collection of text representing a plurality of confidential data from a first computing device. The annotation server may convert the document to a plurality of text embeddings. The annotation server may input the text (Continued)

embeddings into a machine learning model to generate a plurality of synthetic images, and receive a label for each of the plurality of synthetic images from a third-party labeler. Accordingly, the annotation server may send the confidential data and the corresponding labels to a second computing device.

20 Claims, 4 Drawing Sheets

(51) Int. Cl.
  *G06F 21/62* (2013.01)
  *G06N 20/00* (2019.01)
  *G06V 20/62* (2022.01)
  *G06V 30/262* (2022.01)

(56) References Cited

U.S. PATENT DOCUMENTS

| | | | | |
|---|---|---|---|---|
| 11,657,307 | B1* | 5/2023 | Bodapati | G06N 20/00 706/15 |
| 2020/0311300 | A1* | 10/2020 | Callcut | G06F 30/20 |
| 2020/0364347 | A1* | 11/2020 | Lewis | G06F 21/566 |
| 2021/0334455 | A1* | 10/2021 | Gkoulalas-Divanis | G06F 40/216 |
| 2023/0186098 | A1* | 6/2023 | Chang | G06N 3/045 706/25 |

OTHER PUBLICATIONS

Zhang, Han et al.: "StackGAN: Text to Photo-realistic Image Synthesis with Stacked Generative Adversarial Networks," pp. 1-14, Aug. 5, 2017—Rutgers University et al.

Li, Bowen et al.: "Controllable Text-to-Image Generation," pp. 1-11, Dec. 19, 2019—University of Oxford.

Jun. 7, 2022—(WO) International Search Report and Written Opinion—App No. PCT/US2022/016638.

Shirai, Sola et al. "Privacy-Preserving Annotation of Face Images through Attribute-Preserving Face Synthesis" 2019 IEEE/CVF Conference on Computer Vision and Pattern Recognition Workshops (CVPRW), IEEE, Jun. 16, 2019, pp. 21-29, XP033747258, DOI: 10.1109/CVPRW.2019.00009 Sections 1 and 4; figures 2,3.

Shrivastava et al., "Learning from Simulated and Unsupervised Images Through Adversarial Training" Proceedings of the IEEE Conference on Computer Vision and Pattern Recognition, (Year 2017).

* cited by examiner

PRIVACY PRESERVING DATA LABELING

CROSS-REFERENCE TO RELATED APPLICATIONS

The instant application is a continuation of and claims priority to co-pending U.S. patent application Ser. No. 17/177,822, titled "Privacy Preserving Data Labeling," filed on Feb. 17, 2021, the disclosure of which is hereby incorporated by reference in its entirety.

FIELD OF USE

Aspects of the disclosure relate generally to big data and more specifically to the privacy and labeling of the big data.

BACKGROUND

In building, managing and evaluating machine learning workflows, a massive amount of data may be collected and annotated (i.e. "labeled"). Data labeling may be a process to highlight certain data features, such as properties, characteristics or classifications so that the collected data may be analyzed by the machine learning models. Data labeling may be time consuming and resource draining in the machine learning pipeline. This task may impose a greater challenge in certain industries that deal with confidential information. That is, disclosing confidential information to a third-party labeling system may compromise the confidential data and/or run afoul of privacy laws. As a result, these industries may not be able to label confidential data with efficiency while preserving the privacy of the confidential data. This may limit those industries' ability to use machine learning models to provide predictions, insights, and forecasts.

Aspects described herein may address these and other problems, and generally improve the quality, efficiency, speed and privacy of processing confidential data so that the confidential data may be annotated to preserve privacy.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for labeling data to preserve privacy. An annotation system may receive a document from a first computing device. The document may be in a first data format. Additionally, the document may comprise a plurality of text fields. One or more of the plurality of text fields may comprise confidential data. The annotation system may convert the document from the first data format to a second data format. The first data format may comprise a text format, and the second data format may comprise a vector. The second data format may include text embeddings that are generated based on the plurality of text fields. The annotation system may input the text embeddings into a machine learning model, such as a Generative Adversarial Network (GAN), to generate a plurality of synthetic images. Each of the plurality of synthetic images may correspond to each of the plurality text fields. The annotation system may receive the plurality of synthetic images from the machine learning model, and send the plurality of synthetic images to a labeler. Subsequently, the annotation may receive a label for each of the plurality of synthetic images. Accordingly, the plurality of text fields and the labels for the plurality of synthetic images may be sent to a second computing device.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for labeling data that may include confidential data to preserve privacy. The annotation system may convert the collection of text to the text embeddings via an auto encoder. The annotation system may generate a plurality of text-image pairs; and the machine learning model (e.g., GAN model) may be trained based on the plurality of text-image pairs and ground-truth images. The annotation system may further train the machine learning model to recognize a mapping between the text embeddings and the plurality of synthetic images. In many aspects, the labels for the synthetic images may include at least one of a negative label or a positive label. The synthetic images may also comprise computer programing code images, and the labels for the synthetic images may include clean or buggy.

The annotation system as described herein allows for generating a first set of synthetic images by a generator of a machine learning model, such as a GAN model. The first set of synthetic images may be generated based on a first set of model parameters using the text embeddings as inputs. The first set of synthetic images may be evaluated by a discriminator of the machine learning model. The first set of synthetic images may be associated with a first prediction of authenticity. The annotation system further allows for generating a second set of synthetic images by the generator. The discriminator may evaluate the second set of synthetic images to generate a second prediction of authenticity. The machine learning model may be tuned based on the first set of model parameters, the second set of model parameters, the first prediction of authenticity and the second prediction of authenticity.

Annotation Systems

Figure 1:
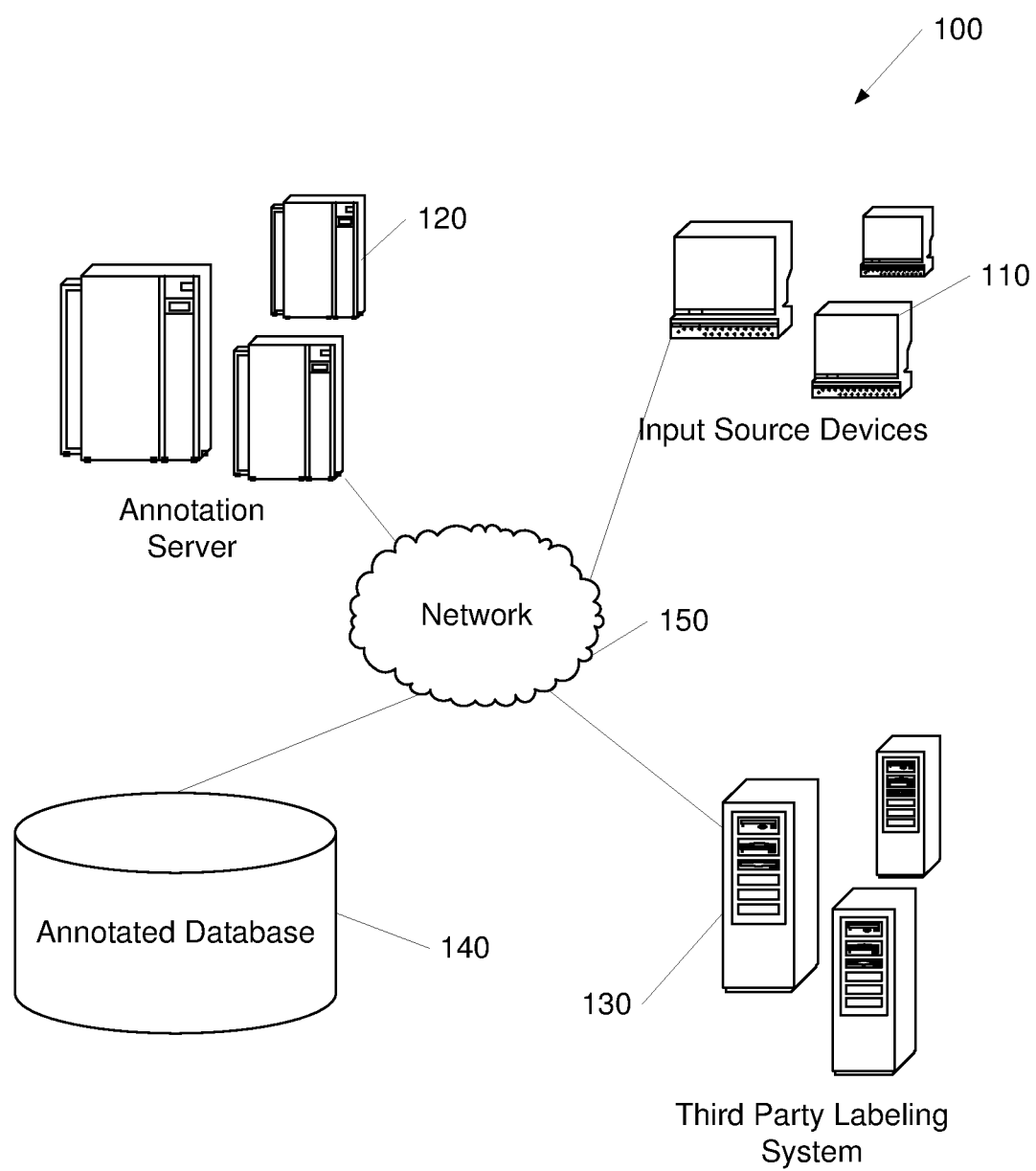
FIG. 1 shows an example of a system for labeling confidential data to preserve privacy in which one or more aspects described herein may be implemented.

FIG. 1 shows an annotation system 100. The annotation system 100 may include at least one input source device 110, at least one annotation server 120, at least one third-party labeling system 130, and/or at least one annotated database 140 all interconnected via a network 150. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Input source device 110 may be any device capable of obtaining a document that contains a collection of text, some of which may represent confidential data. For example, the collection of text may comprise personally identifiable information (PII). In some instances, the collection of text may be related to a transaction record containing confidential financial data. The collection of text may be related to comments or feedback of a service provided by a financial institution or other service provider that may be potentially embarrassing if it were to be divulged to a third-party. The collection of text may include personnel information, such as performance reviews that may be sensitive or confidential. The collection of text may also be related to documents reviewed during a litigation process that may be confidential or privileged and may not be disclosed to a third-party. Input source devices 110 may include scanner, a camera, camera-arrays, camera-enabled mobile-devices, etc. Alternatively, input sources may include computing devices, such as laptop computers, desktop computers, mobile devices, smart phones, tablets, and the like. According to some examples, input sources may include hardware and software that allow them to connect directly to network 150. Alternatively, input source devices 110 may connect to a local device, such as a personal computer, server, or other computing device, which connects to network 150. In some embodiments, input source devices 110 may include a scanner associated with an automated teller machine (ATM). The scanner may be configured to scan checks, certificates of deposit, money orders, and/or currency. In other embodiments, the input source 110 may be a scanner located at a branch location. The scanner may be configured to scan documents, such as loan and/or credit applications, and securely transmit the documents to a central location, such as a head office or a central banking location, for further processing.

Annotation system 120 may collect, parse, and/or store documents containing confidential data. The documents may be stored as unstructured data from various input sources which may include books, journals, metadata, health records, audio, video, analog data, images, files, and/or unstructured text, such as the body of an e-mail message, Web page, or word-processor document. For example, annotation system 120 may extract content and/or data from a content website automatically using a bot or web scraper. Annotation system 120 may access the content website using a web protocol, such as Hypertext Transfer Protocol (HTTP), or through a web browser. Annotation system 120 may obtain a data dump from the content sources and store the data in a corpus database (not shown in FIG. 1). The corpus database may also be part of annotated database 140. Annotation system 120 may copy or collect unstructured data in a text format from the web, convert the news data into a common format, such as a JavaScript Object Notation (JSON) format or an Extensible Markup Language (XML) format. Annotation system 120 may store the documents containing confidential data in the corpus database for later retrieval or analysis.

Annotation server 120 may retrieve the documents containing confidential data from the corpus database or receive the documents from input source devices 110. Annotation server 120 may parse collections of text in the documents to identify keywords and/or confidential data. Annotation server 120 may filter certain stop words from the text, such as "that," "the," "are," "to" and the like, to adjust for the fact that some words may appear more frequently, but carry less weight. Annotation server 130 may filter the stop words using, for example, term frequency-inverse document frequency (TFIDF), which may be a numerical statistic model that may reflect how important a word is to a document in a collection or corpus.

Annotation server 120 may convert a document containing confidential data into text embeddings based on a collection of text in the document. Annotation server 120 may subsequently input the text embeddings to a machine learning model, such as a GAN model, to generate a plurality of synthetic images. The machine learning model may be a component of annotation server 120. Alternatively, the machine learning model may be on a computing device separate from annotation server 120. Annotation server 120 may send the plurality of synthetic images to third-party labeling system 130, which may label each synthetic image with one or more labels. The labels may identify each synthetic image using a binary classification, such as positive or negative. Third-party labeling system 130 may also label each synthetic image with a generic label such as class 1 (e.g. bright) or class 0 (e.g. dark), where the third-party labeling system may not understand the underlying meaning of each class. Given that the original text in the documents may not be visible to the third-party labeling system and the underlying meaning of the classes may be hidden from the third-party labeling system, the privacy of confidential data in the original documents may be preserved. Annotation server 120 may send the labels with the corresponding embeddings, text and documents into annotated database 140 for storage. A document may correspond to a plurality of labels, which may be matched back to certain portions of the original documents. The mapping between a label and a corresponding portion of the original document may be stored in annotated database 140.

Annotated database 140 may store documents with confidential data and their corresponding labels. For example, annotated database 140 may store transaction records related to transactions previously conducted by users in transaction streams from customers of a financial institution. The transaction records may each contain an account identifier, a transaction amount, a transaction time and a merchant identifier. A transaction record may be stored with a label, such as class 1 or class 0, where class 1 may correspond to non-fraudulent transactions and class 0 may correspond to fraudulent transactions. In another example, annotated database 140 may store comments or feedback from customers related to a service provided by a financial institution or other service providers. For example, a record in annotated database 140 may include a record identifier, a customer identifier, a comment field related to feedback on a service provided, and a label such as a negative or positive to indicate the nature of the customer experience with the service.

Annotation server 120 may later retrieve the labeled documents containing confidential data and send to a computing device (not shown) to provide insights to the confidential data to facilitate tasks related to, for example, credit decisioning process and fraud detection logics. For example, the computing device may be a server in a financial institution that processes loan and/or credit applications. Based on the label indicating the related transaction being fraudulent or non-flatulent, the computing device may approve or deny the applications.

Input source devices 110, annotation server 120, third-party labeling system 130, and/or annotated database 140 may be associated with a particular authentication session. Annotation server 120 may receive, process, and store a variety of transaction records and other confidential information, and/or receive transaction records from input source devices 110 as described herein. However, it should be noted that any device in annotation system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 180 may include a local area network (LAN), a wide area network (WAN), a wireless telecommunications network, and/or any other communication network or combination thereof.

The data transferred to and from various computing devices in annotation system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in annotation system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in annotation system 100 in front of one or more computing devices such that any external devices may communicate directly with the specialized hardware.

Computing Devices

Figure 2:
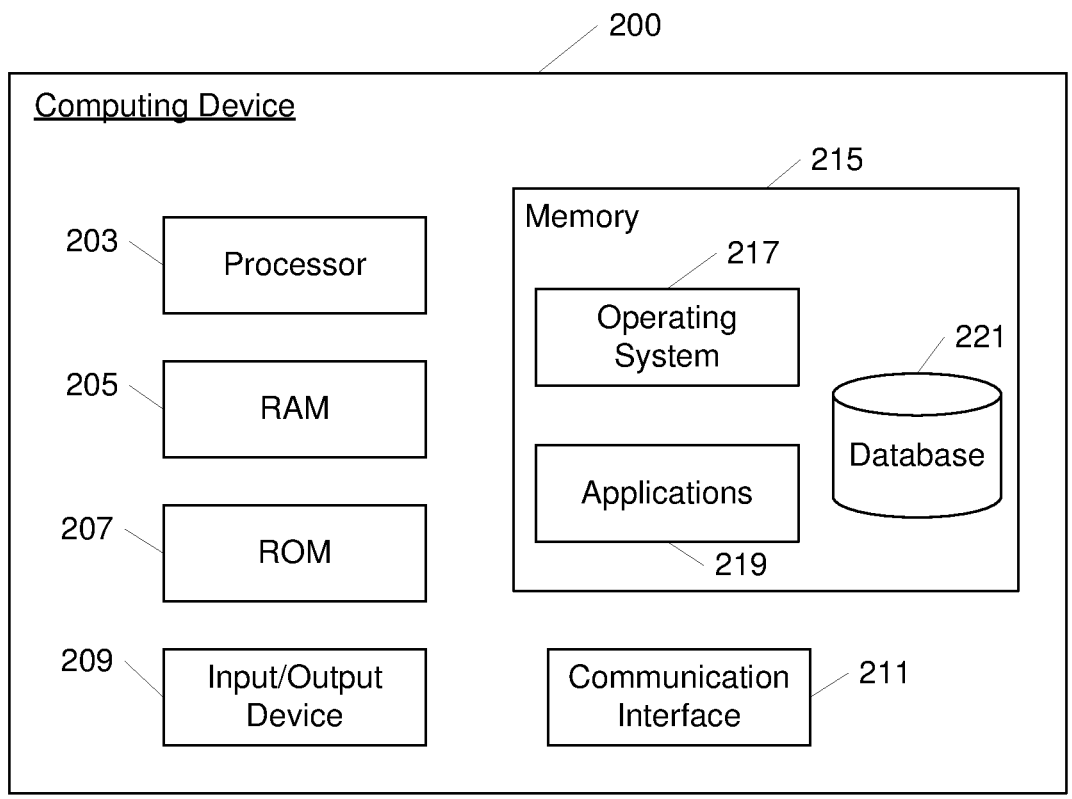
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Labeling Confidential Data to Preserve Privacy

As noted above, industries may acquire confidential and/or confidential information about users via documents, forms, etc. Machine learning models may be used to analyze those documents to identify the data and/or information contained in these documents, forms, etc. Additionally or alternatively, machine learning models may be used to identify the context (e.g., positive or negative, light or dark, good, or bad, etc.). The confidential and/or sensitive information may have to be labeled, for example, as part of the training data for the machine learning model or as part of the recognition performed by the machine learning model itself. In this regard, the confidential and/or sensitive information may be sent to a labeler system. Accordingly, there is a need to protect the confidential and/or sensitive information from inadvertently being disclosed to the labeler system.

The annotation system described herein may protect confidential and/or sensitive information by converting the text associated with confidential and/or sensitive text to an image prior to sending the confidential and/or sensitive information to a labeler system. The annotation system, such as annotation server 120, may receive one or more documents, for example, from input sources 110. The annotation system may convert a first document, of the one or more documents, with confidential data into text embeddings. The annotation system may use a machine learning model to generate synthetic images based on mappings between the text embeddings and the synthetic images. A third-party labeling system may label the synthetic images without the knowledge of the text underlying the text embeddings. As such, the privacy of the confidential data in the original documents may be preserved.

Figure 3:
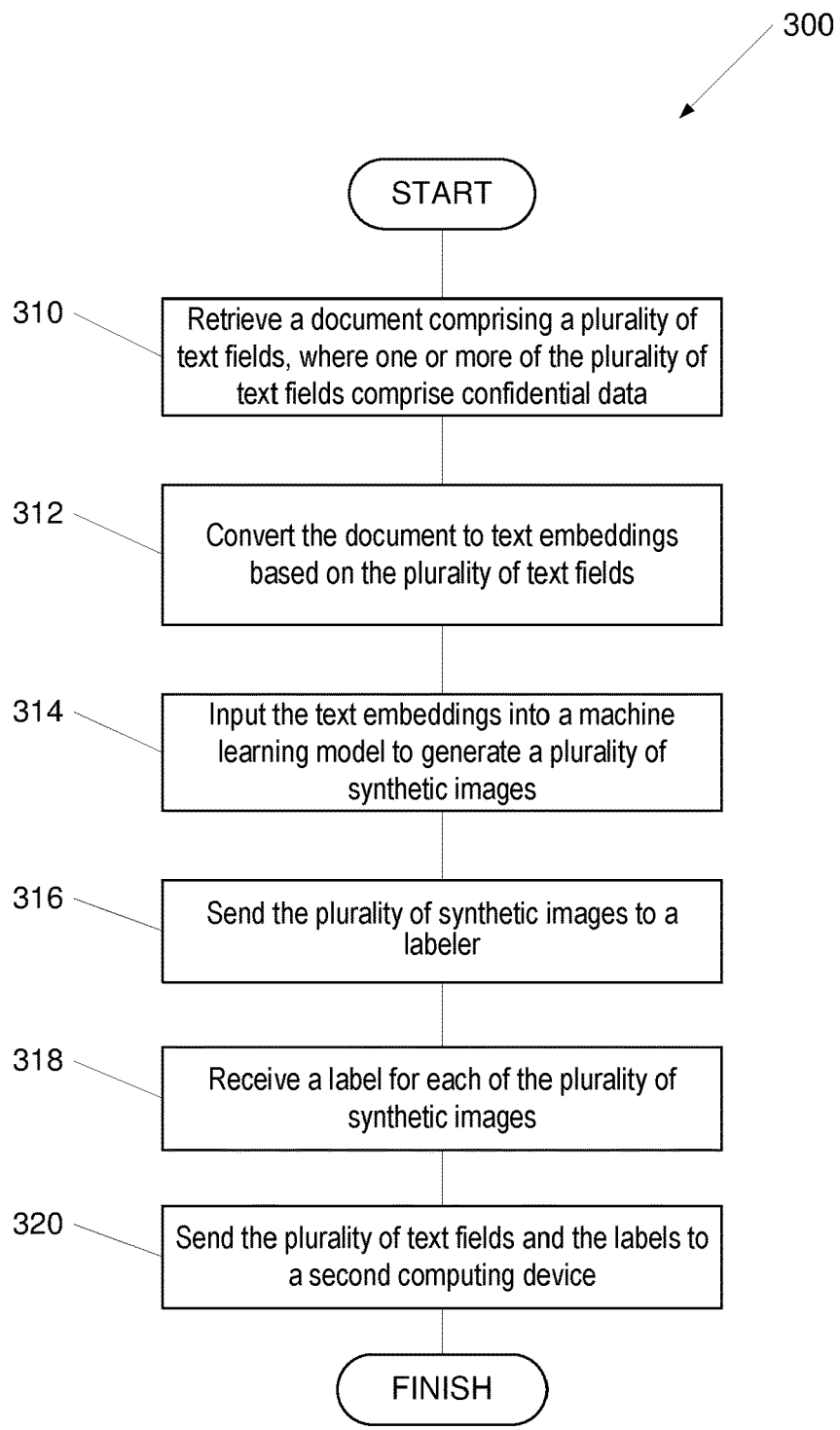
FIG. 3 shows a flow chart of a process for labeling confidential data to preserve privacy according to one or more aspects of the disclosure.

FIG. 3 shows a flow chart of a process 300 for labeling confidential data to preserve privacy according to one or more aspects of the disclosure. Some or all of the steps of process 300 may be performed using one or more computing devices as described herein.

At step 310, a document comprising a collection of text may be received from a first computing device. The document may be in a first data format, and the collection of text may represent a plurality of confidential data. For example, an annotation server may receive a document related to customer feedback on the service provided by a financial institution and the comments may be labeled as positive or negative. The document may include a collection of text, for example, six sentence comments that may have extremely negative comments that is potentially embarrassing to be divulged to a third-party. Alternatively, the document may comprise a mix of positive and negative comments. In another example, the document may include transaction records related to previously conducted transactions that may be labeled either as fraudulent or non-fraudulent. The transaction records may provide insights to facilitate credit decisioning and/or fraud detection logics. The transaction records may include confidential information such as an account identifier, a transaction amount, a transaction time, transaction location, a channel of transaction (e.g. online or in physical store) and a merchant identifier. In a variety of embodiments, the documents may be collected as unstructured data format, such as text format and converted into a common format, such as a JSON format, CSV format, or an XML format.

In a variety of embodiments, the documents may be collected and processed in a data stream in real time. The collected documents may be processed in a batch process. For example, the documents containing confidential data may be collected periodically or the documents may be dumped periodically, such as once per 10 minutes, once per hour, or once per day. Confidential data in the text format may be pre-processed via a random sampling to eliminate duplicated data. Confidential data may be dumped after a verification of non-duplicated data to produce a light weight data payload.

Annotation server may use natural language processing (NLP) or optical character recognition (OCR) to parse the documents and/or identify keywords. Annotation server may remove certain stop words that do not add much meaning to the sentences, such as "and," "at," "the," "is," "which," etc.

At step 312, the annotation server may convert the document to create the text embeddings, for example, based on the collection of text. Annotation server may convert the document from the first data format to a second data format to embed the plurality of confidential data in the document. The second data format may include text embeddings that are generated, for example, based on the collection of text. Annotation server may use an autoencoder, such as a variational autoencoder (VAE), to convert the documents. An autoencoder may be a type of artificial neural network used to learn efficient data codings in an unsupervised manner. The autoencoder may learn a representation (e.g. encoding) for a set of data for the purpose of dimensionality reduction by training the network to ignore signal "noise." The autoencoder may have a reconstructing side, where the autoencoder may generate, from the reduced encoding, a representation a close approximation, if not an identical reproduction, of the original input. An embedding may be a compact representation of the original data. Annotation server may use language modeling and/or feature learning techniques in NLP where keywords or phrases from the collection of the text may be mapped to vectors of real numbers. In the example above, where a document contains a comment comprising six sentences, the annotation server may convert each of the six sentences into a feature vector. For example, a first feature may be generated based on keywords in the first sentence. In some examples, the feature vector may be a ten-dimensional vector that maintain the features of the original data sample. Likewise, annotation server may convert the second sentence in the comment into a second feature vector. In another example, where the document contains various transaction records, the document may include keywords related to a transaction, such as an account identifier, a transaction amount, a transaction time, transaction location, a channel of transaction (e.g. online or in physical store), a merchant identifier, a merchant code, etc. Annotation server may convert transaction-related information into text embeddings corresponding to one or more feature vectors. The one or more feature vectors may be based on the keywords related to the transaction.

At step 314, the annotation server may input the text embeddings into a machine learning model, such as a Generative Adversarial Network (GAN) model, to generate a plurality of synthetic images. The machine learning model may use ground-truth images and text-image pairs as training data. The machine learning model may use, for example, a small set of training data. The training data may comprise transaction records and/or their corresponding images. For example, a transaction record indicating a non-fraudulent transaction that occurs at regular hour, originated from a customer's regular cell phone, and within a certain transaction amount may correspond to an image with a bright color. In contrast, a transaction record indicating a fraudulent transaction that occurs at an irregular hour (e.g., 2:00 am in the customer's time zone), originated from a transaction place that is thousand miles away from the customer's home, and for a transaction amount much greater than the customer's regular transaction amount may correspond to an image with a dark color. If the status of a transaction record is unknown, the corresponding image may be in grey color.

In a variety of embodiments, the machine learning model may cast the text embeddings into different domains. For example, the machine learning model may convert a first set of transaction records to an image domain. The machine learning model may convert a second set of transaction records to a programming code image domain. In the image domain, the GAN model may generate synthetic images that may be later labeled, for example, as bright or dark. The synthetic images in the image domain may include images of animals, people, trees, sceneries, etc. In the programing code image domain, the machine learning model may generate a collection of programming codes that may appear clean or buggy. The programing codes may include Java, Python, C++, Perl, etc.

The machine learning model may also include a discriminator. The discriminator may evaluate the generated synthetic images to ensure that the generated synthetic images may look as real as possible. The discriminator may also be used to improve the performance of the generator of the machine learning model. Based on the feedback from the customers that the generated synthetic images appear real or unrealistic, the generated image may be tuned to reflect the meaning of the original text as much as possible. The machine learning model may be trained to recognize a mapping between the text and the image, and vice versa. As such, the machine learning model may be trained to recognize the original characteristics of the text through the synthetic images.

In a variety of embodiments, the same positive text may be converted to the same class of positive images. In the case with the document containing a comment comprising six sentences, the first three sentences may be positive. Each of the first three sentences may be converted to a first synthetic image. Each of the first synthetic images may be associated with a class of synthetic images having a bright composition (e.g., bright or warm colors). The second three sentences may be negative. Like the first three sentences, each of the second three sentences may be converted to a second set of synthetic images. Each of the second set of synthetic images may be associated with a class of synthetic images having a dark composition (e.g., darker or cold colors). Likewise, the machine learning model may generate a synthetic image based on a transaction information, with different shades of darkness in the corresponding pixels of the image.

In a variety of embodiments, the synthetic images may be generated using a machine learning algorithm, such as the GAN model discussed above. Additionally or alternatively, the machine learning model may be a neural network, such as a GAN, or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. The neural network may be trained using supervised learning, unsupervised learning, back propagation, transfer learning, stochastic gradient descent, learning rate decay, dropout, max pooling, batch normalization, long short-term memory, skip-gram, or any equivalent deep learning technique.

At step 316, the annotation server may send the plurality of synthetic images to a labeler. The labeling process may be performed by an individual data labeler. Additionally or alternatively, the labeling process may be crowdsourced, for example, via the Mechanical Turk (MTurk), which is a crowdsourcing website for businesses (known as Requesters) to hire remotely located "crowdworkers" to perform discrete on-demand tasks, such as identifying specific content in an image or labeling the image. For example, the MTurk may label an image as a dog or a cat, without the knowledge of the underlying meaning of the original text corresponding to the image. While an institution (e.g., financial institution), who has access to the original text of the document, may have knowledge that the label "dog" corresponds to fraudulent transactions, and the label "cat" corresponds to non-fraudulent transactions. The MTurk may label the image as positive or negative, and the financial institution may have the knowledge that the labels may correspond to positive comments or negative comments on a service provided by the financial institution. In the programing code image domain, the MTurk may label the generated codes as clean or buggy, and the financial institution may have the knowledge that the labels may correspond to positive comments or negative comments, respectively. The labels used by the MTurk may also be non-binary, such as bright, dark or grey. Different third-party labeling systems may be assigned to work on different domains, so that the privacy of the underlying confidential data may be further preserved.

After the synthetic images are labeled, the confidential data in the original document corresponding to the images may be marked up or annotated to show the target, which may be the features the machine learning model may be set to predict. Data labeling may refer to tasks that include data tagging, annotation, classification, moderation, transcription, or processing. A document may contain a plurality of portions, with each portion corresponding to a synthetic image labeled by the labeler. For example, a document may include six portions where each portion corresponds to a synthetic image to be labeled. The labeler may label the first three images as positive (e.g. class 1) and the next three portions as negative (e.g. class 0).

The labeled data may highlight data features, which may be the properties, characteristics, or classifications of the confidential data. These features may be analyzed for patterns that may be helpful to predict the target. For example, the data labeler may label the synthetic image as positive or negative, which may be helpful to predict the original comment to be positive or negative.

In a variety of embodiments, labels may be used to identify and call out features that are present in the data. It may be helpful to choose informative, discriminating, and independent features to label so that high-performing algorithms in pattern recognition, classification, and regression may be developed. Accurately labeled data may provide ground truth for testing and iterating the machine learning model.

At step 318, the annotation server may receive one or more labels for each of the plurality of synthetic images. Annotation server may store the labels with the original confidential data in the annotated database. For example, the annotated database may have a first record including a first sentence in a comment from a customer regarding a service provided by the institution. Annotation server may store a first label for a synthetic image associated with the first sentence in the first record. Likewise, annotation server may store a second record including a second sentence in the comment with the second label. Annotated database may accordingly store six records corresponding to each of the six sentences in the comment, with the first three records all having positive labels (e.g. class 1) and the next three records all having negative labels (e.g. class 0). As such, the mappings between the labels to the particular portions or features of the original document may be stored in the annotation database. The stored documents and the corresponding labels may be later retrieved from the annotated database and to be used as inputs to a machine learning model as needed.

At step 320, the annotation server may send the document containing confidential data and the labels to a second computing device. Annotation server may retrieve the record containing the confidential data and the labels from the annotated database. Annotation server may send the record to a second computing device, such as a server that conducts credit decisioning for loan or credit card applications or fraud detecting logics for transaction processing.

Figure 4:
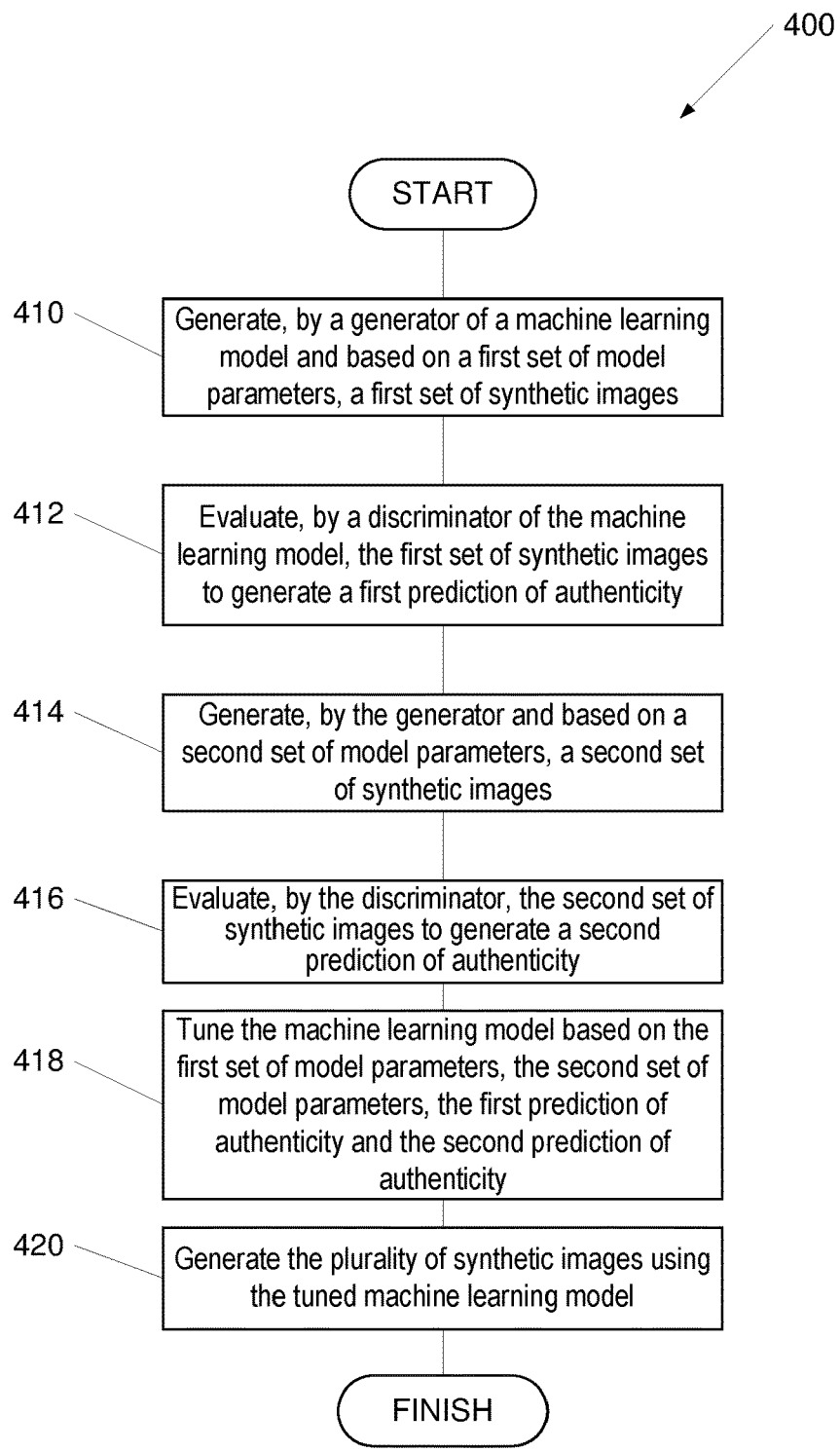
FIG. 4 shows a flow chart of a process for tuning a machine learning model according to one or more aspects of the disclosure.

FIG. 4 shows a flow chart of a process of tuning the machine learning model according to one or more aspects of the disclosure. Some or all of the steps of process 400 may be performed using one or more computing devices as described herein.

At step 410, a generator of a machine learning model may generate a first set of synthetic images using text embeddings as inputs, for example, based on a first set of model parameters. The model parameters may be related to parameters such as the number of layers of the neural network, a size of each of the layers, and/or a learning rate. For a convolutional network, the model parameters may include additional parameters such as a filter size, a number of filters and a number of convolutional layers.

At step 412, a discriminator of the machine learning model may evaluate the first set of synthetic images to generate a first prediction of authenticity. The discriminator may compare the first set of synthetic images with ground-truth images to determine a first prediction of authenticity to indicate a degree of realism for each of the generated images. The generated images may be fed into the discriminator with ground-truth images. The discriminator may take in both real and fake images and return predicted labels, such as real and fake.

In a variety of embodiments, MTurk may be used to minimize the costs and/or time required to label and annotate a massive amount of data, which may also be used for tuning the machine learning models and/or identify the characteristics of the data. Building an efficient machine learning model may need continuous iterations and corrections. Another usage of MTurk may be human-in-the-loop (HITL), where human feedback may be used to help validate and/or retrain the machine learning model. HITL may leverage both human and machine intelligence to create machine learning models. In a human-in-the-loop configuration, people may be involved in a virtuous circle of improvement where human judgement may be used to train, tune, and test a particular data model.

At step 414, the generator may generate a second set of synthetic images, for example, based on a second set of model parameters. The second set of model parameters may be updated based on the adjustment on the first set of model parameters. At step 418, the discriminator may evaluate the second set of synthetic images to generate a second prediction of authenticity. Similar to step 412, the discriminator may take in both real and fake images and return predicted labels, such as real and fake. The predicted labels may be represented in probabilities, as a number between 0 and 1, with 1 representing a prediction of authenticity and 0 representing fake. In implementation, there may exist a double feedback loop, where the discriminator may be in a feedback loop with the ground-truth images, which are real, and the generator may be in a feedback loop with the discriminator. In this dynamic process, each side may learn the other's methods in a constant escalation. Both the generator and the discriminator may optimize a different and opposing objective function, or loss function, in a zero-sum game so that as the discriminator changes its behavior, so does the generator, and vice versa and their losses push against each other.

At step 420, the machine learning model may be tuned, for example, based on the first set of model parameters, the second set of model parameters, the first prediction of authenticity and the second prediction of authenticity. Based on a comparison between the first prediction of authenticity and the second prediction of authenticity, the machine learning model may determine a more optimal set of parameters between the first set of model parameters and the second set of model parameters. The machine learning model may also be tuned, for example, when the second prediction of authenticity has reached a predetermined threshold.

At step 422, a plurality of synthetic images may be generated using the tuned machine learning model. After the model parameters have been determined for the tuned machine learning model, the tuned machine learning model may generate synthetic images, for example, based on inputs such as the text embeddings representing the original confidential data.

The techniques described herein may be used to label confidential data to preserve privacy. By converting the text into synthetic images using a machine learning model, the confidential data contained in the text may be obfuscated from the third-party labeler. The privacy of the confidential data may be further preserved by casting the text into different domains, such as an image domain or a programing code image domain, so that the underlying meaning of the original text may be further hidden from third-party labelers who work on labeling data in separate domains.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   generating, based on a plurality of confidential data in a document, text embeddings;
   inputting the text embeddings into a machine learning model to generate a plurality of synthetic images, wherein each of the plurality of synthetic images corresponds to one of the plurality of confidential data;
   receiving, from a first computing device of a data labeler, a label for each of the plurality of synthetic images; and
   sending, to a second computing device, the plurality of confidential data and the label for each of the plurality of synthetic images corresponding to the plurality of confidential data.

2. The computer-implemented method of claim 1, wherein the machine learning model comprises a Generative Adversarial Network (GAN) model.

3. The computer-implemented method of claim 1, further comprising:
   training the machine learning model to recognize a mapping between the plurality of the confidential data and the plurality of synthetic images.

4. The computer-implemented method of claim 1, further comprising:
   receiving, from the second computing device and in a first data format, the document comprising a collection of text representing the plurality of confidential data; and
   converting the document from the first data format to a second data format to embed the plurality of confidential data in the document, wherein the second data format comprises the text embeddings that are generated based on the collection of text.

5. The computer-implemented method of claim 4, wherein:
   the first data format comprises a text format, and
   the second data format comprises a vector.

6. The computer-implemented method of claim 4, wherein converting the document comprises:
   converting the collection of text to the text embeddings using an encoder.

7. The computer-implemented method of claim 6, wherein the encoder comprises at least one of an auto encoder or a variational auto encoder.

8. The computer-implemented method of claim 1, further comprising:
   generating a plurality of text-image pairs; and
   training the machine learning model based on the plurality of text-image pairs.

9. The computer-implemented method of claim 1, further comprising:
   training the machine learning model based on ground-truth images.

10. The computer-implemented method of claim 1, wherein the label for each of the plurality of synthetic images comprises at least one of a negative label or a positive label.

11. The computer-implemented method of claim 1, wherein the label for each of the plurality of synthetic images comprises at least one of a dark label or a bright label.

12. The computer-implemented method of claim 1, wherein the plurality of synthetic images comprises computer programing code images, and the label for each of the plurality of synthetic images comprises clean or buggy.

13. The computer-implemented method of claim 1, wherein the machine learning model comprises a GAN model and the method further comprises:
   generating, by a generator of the GAN model and based on a first set of model parameters, a first set of synthetic images using the text embeddings as input; and
   evaluating, by a discriminator of the GAN model, the first set of synthetic images to generate a first prediction of authenticity.

14. The computer-implemented method of claim 13, further comprising:
   generating, by the generator and based on a second set of model parameters, a second set of synthetic images;
   evaluating, by the discriminator, the second set of synthetic images to generate a second prediction of authenticity;
   training the GAN model based on the first set of model parameters, the second set of model parameters, the first prediction of authenticity and the second prediction of authenticity; and
   generating the plurality of synthetic images using the trained GAN model.

15. A computer-implemented method comprising:
   sending, from a first computing device to a second computing device and in a first data format, a document comprising a collection of text representing a plurality of confidential data;
   receiving, from the second computing device, text embeddings in a second format, wherein the second computing device converts the document from the first data format to a second data format to embed the plurality of confidential data in the document, wherein the text embeddings are generated based on the collection of text;

receiving, from the second computing device, a plurality of synthetic images, wherein each of the plurality of synthetic images corresponds to one of the plurality of confidential data, and wherein the second computing device inputs the text embeddings into a machine learning model to generate the plurality of synthetic images;

receiving, from the second computing device, a label for each of the plurality of synthetic images; and storing, by the first computing device, the plurality of confidential data and the label for each of the plurality of synthetic images corresponding to the plurality of confidential data.

16. The computer-implemented method of claim 15, wherein the machine learning model comprises a Generative Adversarial Network (GAN) model.

17. The computer-implemented method of claim 15, wherein the machine learning model is trained to recognize a mapping between the plurality of the confidential data and the plurality of synthetic images.

18. The computer-implemented method of claim 15, wherein:
the first data format comprises a text format, and
the second data format comprises a vector.

19. The computer-implemented method of claim 15, wherein the label for each of the plurality of synthetic images comprises at least one of a negative label or a positive label.

20. A secure data labeling system comprising:
one or more processors; and
memory storing instructions that, when executed by the one or more processors, cause the secure data labeling system to:
receive, from a first computing device and in a first data format, a document comprising a collection of text representing a plurality of confidential data;
convert the document from the first data format to a second data format to embed the plurality of confidential data in the document, wherein the second data format comprises text embeddings;
input the text embeddings into a machine learning model to generate a plurality of synthetic images, wherein each of the plurality of synthetic images corresponds to one of the plurality of confidential data;
receive, from the machine learning model, the plurality of synthetic images;
send the plurality of synthetic images to a second computing device of a data labeler;
receive, from the second computing device, a label for each of the plurality of synthetic images; and
send, to the first computing device, the plurality of confidential data and the label for each of the plurality of synthetic images corresponding to the plurality of confidential data.

* * * * *